(12) United States Patent
Arcuri et al.

(10) Patent No.: US 7,351,751 B2
(45) Date of Patent: Apr. 1, 2008

(54) AUTOTHERMAL REFORMER REACTOR PROCESSES

(75) Inventors: Kym Arcuri, Tulsa, OK (US); Kurt Schimelpfenig, Broken Arrow, OK (US); Jim Leahy, Tulsa, OK (US); Michael Morgan, Nowata, OK (US)

(73) Assignee: Syntroleum Corporation, Tulsa, OK (US)

( * ) Notice: Subject to any disclaimer, the term of this patent is extended or adjusted under 35 U.S.C. 154(b) by 611 days.

(21) Appl. No.: 11/032,258

(22) Filed: Jan. 10, 2005

(65) Prior Publication Data

US 2005/0239909 A1 Oct. 27, 2005

Related U.S. Application Data

(60) Provisional application No. 60/535,108, filed on Jan. 8, 2004.

(51) Int. Cl.
*C07C 27/00* (2006.01)
(52) U.S. Cl. ........................ 518/700; 518/703; 518/704
(58) Field of Classification Search ................ 518/700, 518/703, 704
See application file for complete search history.

(56) References Cited

U.S. PATENT DOCUMENTS

| 3,871,838 | A | 3/1975 | Henkel et al. ................. 48/107 |
| 4,136,015 | A | 1/1979 | Kamm et al. ................ 208/129 |
| 4,166,834 | A | 9/1979 | Reed et al. .................. 422/148 |
| 4,477,262 | A | 10/1984 | Pryor ......................... 48/180.1 |
| 4,833,170 | A | 5/1989 | Agee ........................... 518/703 |
| 4,865,820 | A | 9/1989 | Dunster et al. .............. 422/220 |
| 4,973,453 | A | 11/1990 | Agee ........................... 422/190 |
| 6,085,512 | A | 7/2000 | Agee et al. ................... 60/780 |
| 6,123,873 | A | 9/2000 | Primdahl .................... 252/376 |
| 6,155,039 | A | 12/2000 | Agee et al. ................... 60/780 |

FOREIGN PATENT DOCUMENTS

| WO | WO 0125140 | 4/2001 |
| WO | WO 0230856 | 4/2002 |
| WO | WO 2004090077 | 10/2004 |

OTHER PUBLICATIONS

PCT/US2005/00415 International Search Report dated Jun. 20, 2005 (4 pages).

*Primary Examiner*—J. Parsa (57) ABSTRACT

A process for the startup of an ATR which does not contain an ignition means is provided. Also provided is a process to ascertain ATR catalyst activity prior to introduction of sufficient oxidant to form a flammable feed mixture.

15 Claims, 5 Drawing Sheets

Figure 1: Flammability Limits for Air, Natural Gas (typical concentration) and Steam at ambient conditions and 750 F and 60 psig. Based on data and computational procedures presented in U. S. Bureau of Minels Bulletin #627

Figure 2: Feed Gas Compositions for various Air/NG Ratios Compared with Flammability Limits from Reference 1.

Figure 3: Representative Transient Feed Gas Compositions During Startup of Flameless (Burner Free) ATR Figure 5: Temperature Transients During Startup of ATR System

AUTOTHERMAL REFORMER REACTOR PROCESSES

CROSS REFERENCE TO RELATED APPLICATIONS

This application claims priority to Provisional Application Ser. No. 60/535,108, filed on Jan. 8, 2004.

FEDERALLY SPONSORED RESEARCH

Not applicable.

REFERENCE TO MICROFICHE APPENDIX

Not applicable.

FIELD OF THE INVENTION

The invention relates to processes in an autothermal reformer which does not have an ignition means, such as a flame or glow plug. More specifically, the invention relates to a safe startup process and a method to ascertain ATR catalyst activity prior to the introduction of sufficient oxidant to form a flammable feed mixture.

BACKGROUND OF THE INVENTION

Autothermal reformers ("ATR") are used to convert natural gas, steam and oxygen into synthesis gas ("syngas") using a combination of partial oxidation and reforming. In gas-to-liquids ("GTL") applications utilizing the Fischer-Tropsch process for the production of hydrocarbons, the preferred synthesis gas feed has an $H_2$:CO ratio of between about 2:1 and about 2.2:1.

Commercial ATR systems currently in use for generating syngas for Fischer-Tropsch synthesis utilize $O_2$ rather than air. Commercial ATRs employ a flame or ignition means and allow for the homogeneous partial oxidation reaction of natural gas, steam and air in a zone free of any catalytic material. The partial oxidation ("POX") reaction creates hot gases which are typically in excess of 2200° F. and which then flow into a catalyst bed and undergo endothermic reforming while cooling. Relatively high, greater than about 0.6, steam to natural gas ratios must be employed in existing commercial ATRs in order to avoid soot formation within the high temperature region. Additionally, ignition means, such as burner nozzles and related mechanical equipments in existing commercial ATRs are complex and have limited operating life due to the stresses associated with high temperature operations.

Feed mixtures for existing commercial ATRs typically consist of air, steam and natural gas in ratios which result in an approximate 2.05 to 2.3 $H_2$:CO ratio. Such ATR feed gas ratios are typically in the following ranges:
Air/Natural Gas (A/NG) 2.5-3.2;
Steam/Natural Gas (S/NG) 0.6 to 2.0.

There are several factors that determine the specific ATR feed ratios appropriate for a particular application of the resulting syngas. Such factors include, but are not limited to, the composition of the natural gas, desired syngas compositions, and amount of molecular $H_2$ added to the ATR feed mixture for hydrodesulfurization. The primary constituent of typical field natural gas is methane (>50 volume %) and the concentration of heavier hydrocarbon constituents, typically $C_2$ to $C_{10}$ hydrocarbons can range from about 1% to about 15%. Other non-hydrocarbon constituents, for example argon, nitrogen, $CO_2$, and $H_2S$, may also be present.

Existing commercial ATRs employ mixing of the Natural Gas, air and steam feed constituents. The NG and air are conveyed to the ATR separately and the steam may be fed into the ATR separately or alternatively, may be mixed with either the NG or air prior to feeding into the ATR.

In order to achieve the desired synthesis gas composition, existing commercial ATR operations generally occur at elevated temperatures in the range of 1600° F. to in excess of 2200° F. The design of any commercial ATR involves balancing several process variables including pressure, reactor volume and compression costs. In commercial ATRs utilizing an ignition means or flame, as the pressure increases the extent of methane conversion to CO diminishes. Moreover, higher pressures result in a higher volumetric heat release in the partial oxidation zone with the corresponding thermal, mechanical and soot formation issues.

In the startup of a commercial ATR system, initial ATR feed is typically an inert material, such as steam, nitrogen and possibly natural gas, with initial operation at temperatures less than 400° F. As the ATR temperature is increased, the ATR feed gas composition is transitioned to a mixture of steam and natural gas prior to the introduction of air or oxygen. Upon the introduction of air or oxygen and the transition to the ATR feed gas composition appropriate to producing a synthesis gas suitable, for example, for a Fischer-Tropsch process, the ATR feed gas mixture becomes flammable. A primary safety concern involves the introduction of flammable mixtures into process volumes downstream of the ATR. In ATR systems utilizing an ignition means or flame, the flammable ATR feed mixture undergoes partial oxidation in a specific volume within the reactor designed to handle the flow rates and temperatures associated with the combustion reaction. The ignition means or flame of commercial ATR ensures combustion of the flammable oxygen and natural gas mixture within the ATR and prevents the flammable mixture from exiting the ATR. In flameless ATR systems, however, there is a concern that all or part of a flammable feed mixture might not undergo POX reactions within the ATR and may flow into downstream components. Such failure to undergo POX might occur, for example, because of insufficient ATR catalyst activity. It is not desirable to permit the unreacted flammable feed mixture to exit the ATR because downstream equipment is not necessarily constructed to withstand the high temperatures/pressures generated in the POX reaction. To size and construct=the downstream equipment to safely incur such temperatures and pressures would be prohibitively expensive.

There exists a need for an ignition-less syngas production process which prevents introduction of flammable mixtures to process components downstream of the ATR. There further remains a need for a method to determine ATR catalyst activity.

SUMMARY OF THE INVENTION

The invention provides processes for the safe start-up and operation of a commercially sized ignition-less ATR system employing flammable mixtures of air and natural gas. The start-up procedure is applicable to all partial oxidation and ATR systems which utilize flammable feed gas mixtures and rely on the intrinsic activity of the catalyst and do not employ a flame, or ignition devise, such as a burner, glow plug or other type of device for initiation of the oxidation reaction. The inventive process further avoids unwanted side reactions which may occur during the start-up process.

In the start-up process, the ATR is initially heated with natural gas or an inert to a temperature between about 230° and about 300° F. Once the ATR is above the boiling point of water at the operating pressure, steam and natural gas can be used for continuous heating. The ATR feed gas is heated to between about 600° and about 1000° F. prior to the introduction of an oxidant. Once the partial oxidation is established in the flame or high temperature zone, air is introduced incrementally up to the desired flow rate as the temperature of the entire system approaches the desired operating value.

The process introduces air during start-up into a ignition-less ATR system in such a way as to avoid the possibility of a deflagration event associated with the ignition of a flammable mixture upstream or downstream of the catalyst volume. Upon heating the ATR to an appropriate temperature using NG, steam and/or inert mixtures (between about 600° to about 1000° F.), air is introduced at sufficiently low flow rates so as to ensure that the feed mixture is outside of the flammability envelope. Under these conditions, the initiation of the partial oxidation reaction occurs under the conditions in which the feed gas is non-flammable and incapable of sustaining a flame. Using the inventive method, the failure of the catalyst to initiate the partial oxidation reaction will not result in any dangerous or unsafe operating conditions due to the passage of the unreacted feed gas through the catalyst bed and into downstream process volumes.

DESCRIPTION OF EMBODIMENTS OF THE INVENTION

In U.S. provisional application Ser. No. 60/497,177, (the "177 application) entitled "Process for Production of Synthesis Gas Using an Oxygen Containing Gas," and filed on Aug. 22, 2003, an ignition-less flameless autothermal reformer utilizing a mixture of air, natural gas and steam for the production of a synthesis gas suitable for the Fischer-Tropsch process is described. The '177 application is incorporated herein by reference as if set forth fully herein. In the ATR of the '177 application, the feed gas components are mixed using the appropriate gas velocities, reactor geometry and residence times and subsequently passed into a catalyst bed in which catalytic partial oxidation and reforming occur simultaneously. The design of the flameless ATR of the '177 application is significantly different from other commonly used commercial ATR systems which employ a flame or other ignition means to initiate the partial oxidation reaction. As used herein the term "flameless ATR" means the ATR disclosed in the '177 application as well as other ATR designs which do not utilize a flame, glow plug or other ignition means and/or which are designed for heterogeneous POX. As used herein, the term air includes air having atmospheric levels of oxygen, i.e. about 21% oxygen, and oxygen-enriched air, i.e., having up to about 55% oxygen.

In a flameless ATR, steam and natural gas is premixed and the resulting partial oxidation reaction occurs in a catalyst bed in conjunction with the reforming reaction. The absence of an ignition means or flame simplifies the mechanical design of the system and allows operations at significantly lower steam to natural gas ratios, less than about 0.4, compared to existing commercial ATR designs.

In other embodiments of the invention, the steam may be mixed with either the NG or the air prior to entering the ATR. In a preferred embodiment, a portion of the steam is mixed with both the NG and air feed constituents.

During start-up of the ATR with excess steam it is preferred to add the majority of the steam (greater than 50%), and most preferably greater than 75%, with the air. As the steam is decreased and the feed composition approaches its final operating value, greater than about 60% of the steam may be fed with the NG flow.

During start-up of an ATR, the feed gas composition flowing through the reactor system undergo a transition from inert or non-flammable to a flammable mixture. The term "flammable mixture" herein means a gas composition which possesses sufficient oxidant and fuel to allow a flame to initiate and propagate throughout the gas mixture.

In accordance with some embodiments of this invention, a flameless ATR reactor is pre-heated using a nonflammable feed gas mixture, such as natural gas ("NG"), to a temperature sufficient to initiate catalytic POX. Upon reaching a temperature in which condensation does not occur, steam may be introduced in conjunction with the natural gas. The preferred pre-heat temperature can vary with the type of catalyst and the extent of activity with a specific catalyst. In commercial operations it is anticipated that the catalyst activity will be less than that possible under ideal conditions due to aging and other operating conditions that partially or wholly deactivate the catalyst. In producing synthesis gas for GTL operations, it is preferable to pre-heat the feed gas(es) to the highest possible value compatible with the feed gas composition and process equipment metallurgical constraints. In most applications, the feed gas pre-heat temperature can be as high as 950° F.

Natural gas compositions typically encountered in production fields may be used in the inventive processes. With NG compositions which contain high quantities (>5 vol %) of $C_{2+}$ constituents the maximum allowable pre-heat temperatures may be lowered.

With certain POX catalysts such as rhodium, the maximum pre-heat temperature may be as low as 400° F. However, in the case of aged Ni-based catalysts, higher pre-heat temperatures (>650° F.) are preferable.

Figure 1:
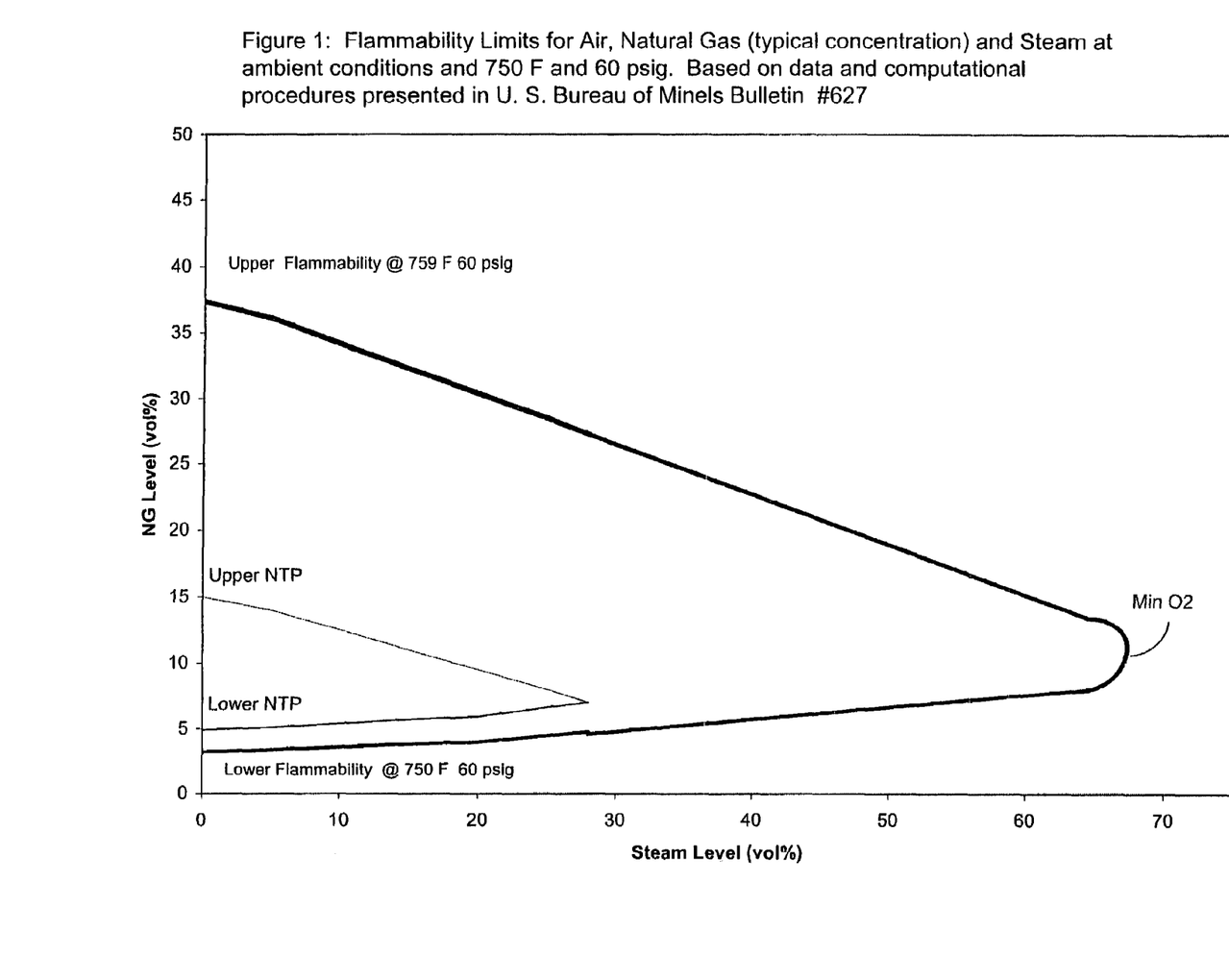
FIG. 1 is a graph depicting the flammability envelope for a natural gas and air mixture.

After heating the ATR reactor to a temperature at which flameless catalytic, i.e., heterogeneous, POX is initiated, air is introduced at sufficiently low rates to maintain the feed composition outside of the flammability envelope. In this embodiment of the inventive process, the air to natural gas ratio is incrementally increased from an initial value well outside the flammability envelope. FIG. 1 presents the flammability limits for a typical natural gas and air mixture determined in accordance with the data and computational procedures described in the U.S. Bureau of Mines Bulletin #627. FIG. 1 depicts the volume % of NG vs. the volume % steam with volume % air being 100%−(volume % NG+volume % steam). The solid lines identified as "Upper NTP"

and "Lower NTP" represent the upper and lower flammability limits for a typical NG, which contains about 85% to 95% methane and about 5% to 15% $C_2H_6$ in a mixture of steam and air at normal temperature and pressure. The upper and lower flammability limits intersect at the point defined as the minimum $O_2$ level required to sustain a propagating flame within the mixture. At higher temperatures and pressures, the flammability limits expand to encompass a broader range of NG values as represented by the composition range included in the flammability envelope at conditions representing ATR startup conditions, 750° F. and 60 psig.

Figure 2:
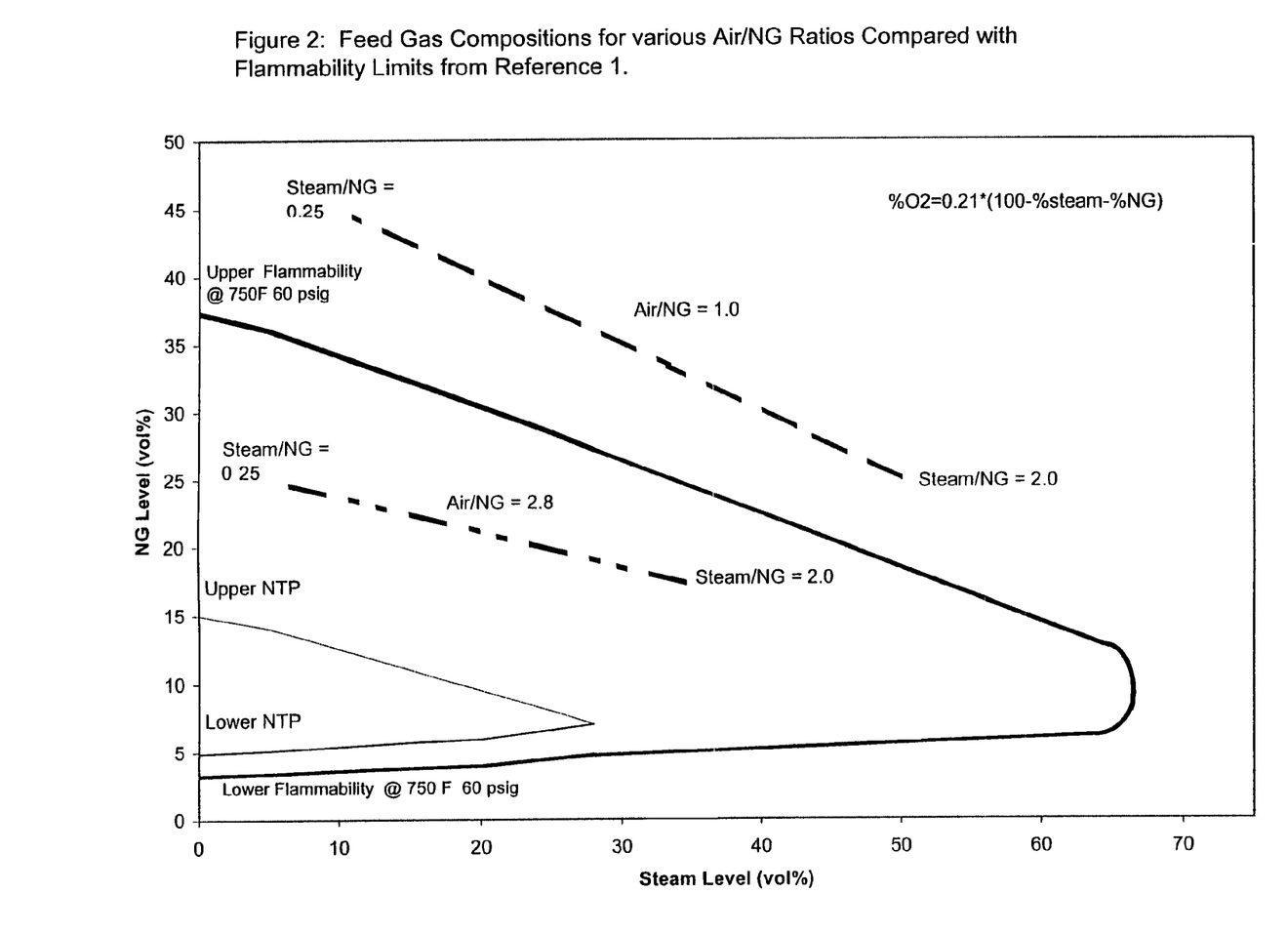
FIG. 2 depicts the flammability envelope of a typical natural gas and air mixture and further shows composition lines representing specific ATR feed mixtures.

FIG. 2 shows the flammability limits as well as composition lines representing ATR feed mixtures containing an air/NG ratio of 1.0 to 2.8 and steam/NG ratios varying from 2.0 to 0.25. As shown in FIG. 2, ATR feeds containing an air/NG ratio of 2.8 lie within the flammability envelope while use of an air/NG ratio of 1.0 leads to mixtures which are well outside of the flammability envelope regardless of the steam/NG ratio.

In one embodiment of the startup method, a feed composition which is outside of the flammability envelope is used. The use of air/NG ratios which are well outside the flammability envelope allows the catalyst to initiate the POX reaction without the risk of introducing a flammable mixture to process volumes downstream of the ATR. In the event that the ATR catalyst has insufficient activity to initiate partial oxidation, the downstream process volumes will fill with an air/NG mixture which cannot propagate a flame and lies outside of the flammability envelope.

In this embodiment of the inventive process, the final feed gas composition is generally between about 5% and about 10% steam, between about 20% and about 30% NG, and <about 2% $H_2$ of the NG flow (or less than about 0.6% of the total flow) with air. The final feed gas composition is reached by initially introducing a feed gas with an air/NG and steam/NG ratio well above the upper flammability limit. Upon introduction of these non-flammable mixtures, the onset of pre-reforming can be observed through a decrease in the catalyst bed and downstream process temperatures and/or analysis of the ATR exist gas composition.

Figure 3:
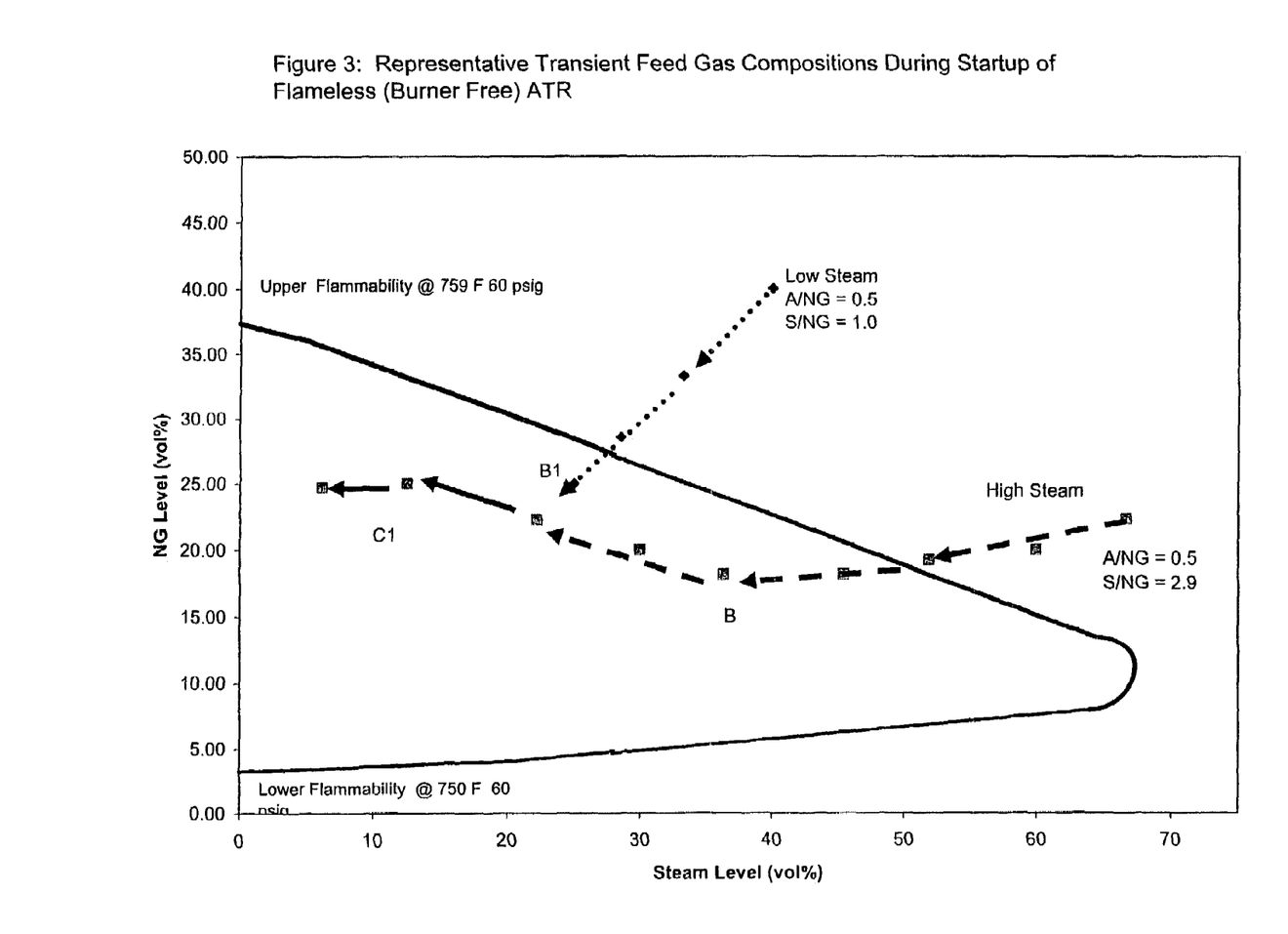
FIG. 3 is a graph which depicts composition transients associated with the startup process of the invention.

FIG. 3 depicts composition transients associated with the startup process. The two dashed lines show representative startup scenarios initially starting with feed gas mixtures well outside of the flammability envelope but employing different steam to natural gas ratios, designated as High Steam and Low Steam. The required changes in composition to reach the final feed gas composition, are represented by the sequential change in feed ratios as indicated by the solid arrows along the dashed lines. The arrows depict the composition changes associated with the feed gas as the air/NG and steam/NG ratios transition from initial startup to final feed gas, i.e. operating ATR feed gas composition. The total amount of gas flow through the startup process may vary or may be held constant during this transition from non-flammable to flammable feed gas composition.

In one embodiment of the invention, a relatively constant gas throughput at the value appropriate to maintain the desired pressure drop and appropriate gas mixing under high turbulent Reynolds number flow, >about 100,000, is employed. As the air concentration in the feed gas approaches a value corresponding to the flammability limit, the gas velocity should be sufficient to ensure that the feed gas residence time prior to contacting the catalyst is less than the time required for auto-ignition. That is, the feed gas should reach the catalyst zone of the ATR prior to the onset of auto-ignition. As shown in FIG. 3, the use of a high steam ratio allows the feed gas to transition into the flammable region at modest air and NG levels with approximately 53% steam. Under such conditions, the onset of partial oxidation should be observed well before the feed gas composition transitions into the flammable region. A temperature decrease in the ATR or a change in the ATR exit gas composition may be used to confirm the onset of pre-reforming.

When the ATR does not employ a flame, burner system or related ignition means, the initiation of the partial oxidation depends upon the activity of the catalyst. That is, the catalyst should preferably have sufficient activity to ensure that POX occurs under thermally stable conditions and in the same reactor volume in which catalytic reforming will occur, i.e., the catalyst zone of the ATR.

The high steam levels in the High Steam embodiment minimize soot formation associated with CO disproportionation over the temperature regime from about 1200° F. to about 1400° F. Upon passage into the flammable zone, the ATR feed gas composition is transitioned to that containing an approximate 2.8 air/NG ratio and a 0.25 steam/NG ratio. This transition occurs by incrementally increasing the air flow or decreasing the steam flow or both. The NG flow may be maintained at a relatively constant rate. However minor adjustments may be necessary, as indicated in FIG. 3 if the total ATR feed gas velocity is to be maintained constant.

The Low Steam embodiment curve depicts changes in the ATR feed gas composition starting in the very fuel rich non-flammable region well above the upper flammability limit and incrementally transitioning to the final, operating ATR feed gas composition. In one embodiment of the invention, during startup under conditions of constant ATR feed gas velocity, the steam and NG flows may be decreased incrementally as the air flow is increased. The onset of the partial oxidation reaction should be observed well before the feed gas mixture transitions into the flammable region. For example, at 30% steam, 35% NG and 35% air, the ATR feed gas mixture contains sufficient $O_2$, approximately 7.3%, to cause a measurable temperature increase within the catalytic bed and a significant change in the gas composition. The compositions presented in FIG. 3 do not show the small amount of $H_2$ which is present in the feed, typically <2 volume % of the NG flow. The $H_2$ feed level is typically introduced at a fixed ratio with respect to NG. Consequently, it can be treated as part of the NG flow and its presence at low levels has no impact on the startup process.

The ATR feed gas velocity can vary during the startup, especially when the composition is outside of the flammability envelope. However, as the ATR feed gas mixture transitions into the flammable region, the ATR feed gas velocity should be sufficient to prevent auto-ignition prior to contact with the catalyst bed. Thus, the ATR feed gas velocity may be adjusted according to process volumes preceding the ATR catalyst bed. In some embodiments, the final operating pressure for the flameless ATR is in the range from about 100 to about 400 psig. The pressure at startup may be less, in the range of between about 30 and about 100 psig.

The High Steam startup curve shown in FIG. 3 crosses the flammable region at a relatively high steam concentration, approximately 50 volume % in the ATR feed gas. The incremental composition changes associated with the High Steam startup involve decreasing the steam rate while increasing the air feed rate and maintaining a relatively constant NG rate. The High Steam embodiment of the invention is particularly useful in commercial systems in which there is a desire to reduce the amount of soot generated.

The High Steam embodiment is generally a less complex process because the major flow changes are associated with only two feed components, i.e. the NG and $H_2$ flows may be held constant throughout the startup procedure. At the point where the ATR feed gas composition enters the flammable region, the ATR feed gas velocity is maintained at the appropriate level to ensure that the inlet residence time is shorter than the auto-ignition time.

In another embodiment of the invention, a process to determine if there is sufficient catalyst activity for the initiation of partial oxidation is provided. This embodiment utilizes detection of reforming of the heavier hydrocarbons in the natural gas prior to introduction of the air as an indication of catalyst activity. In adiabatic reactors the reforming of >1 volume % of the NG flow containing the $C_{2+}$ will result in a measurable decrease in the reactor temperature due to the endothermic nature of the reforming reaction. Catalyst beds which possess sufficient activity towards reforming of the $C_{2+}$ constituents will generally possess sufficient activity to initiate partial oxidation. Alternatively or additionally, analysis of the effluent gas indicating conversion of $C_{2+}$ constituents may be used for detecting catalyst activity.

When air is initially introduced into the ATR, the preferred steam and NG levels are preferably sufficiently high so that the composition is well above the upper flammability limit. In the event that the catalyst does not possess sufficient activity for initiating partial oxidation, the passage of this feed gas to downstream process volumes will not result in the accumulation of a flammable mixture. Consequently the risk of a deflagration event is essentially eliminated.

This method of startup can be applied under conditions of constant or varying total feed gas flow rate. The method employs gas velocities corresponding to inlet feed gas residence times in excess of the ignition or auto-ignition time delay. At the lower pressures and oxygen/NG ratios utilized during the initial phases of startup, lower total gas velocities can be employed.

Although the transition into the flammable mixture can occur anywhere outside the flammability envelope, it is preferred to utilize mixtures which are fuel rich and transition through the upper flammability limit.

EXAMPLE

Figure 4:
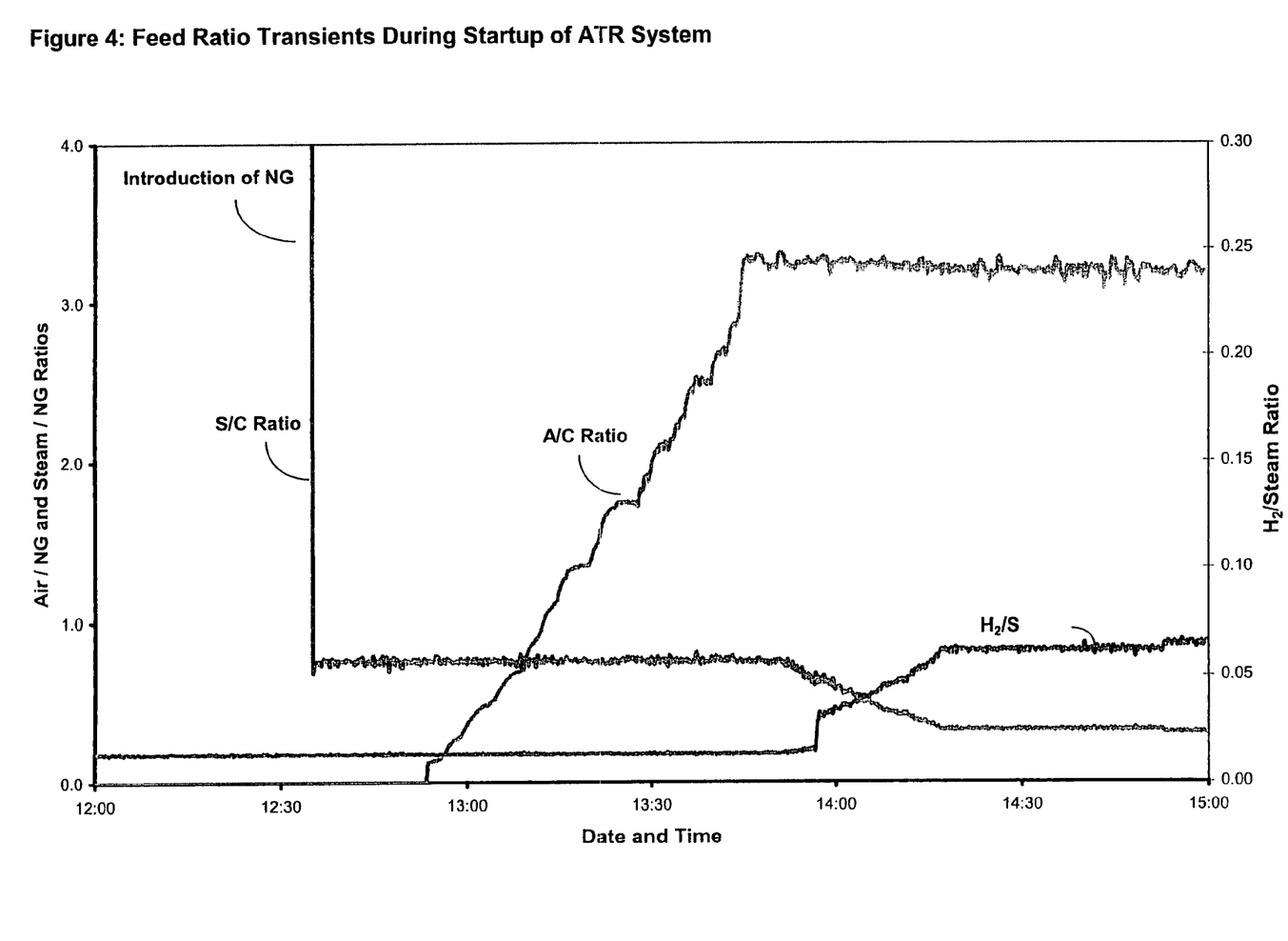
FIG. 4 is a graph depicting the ATR feed gas composition changes during one embodiment of the start-up process
Figure 5:
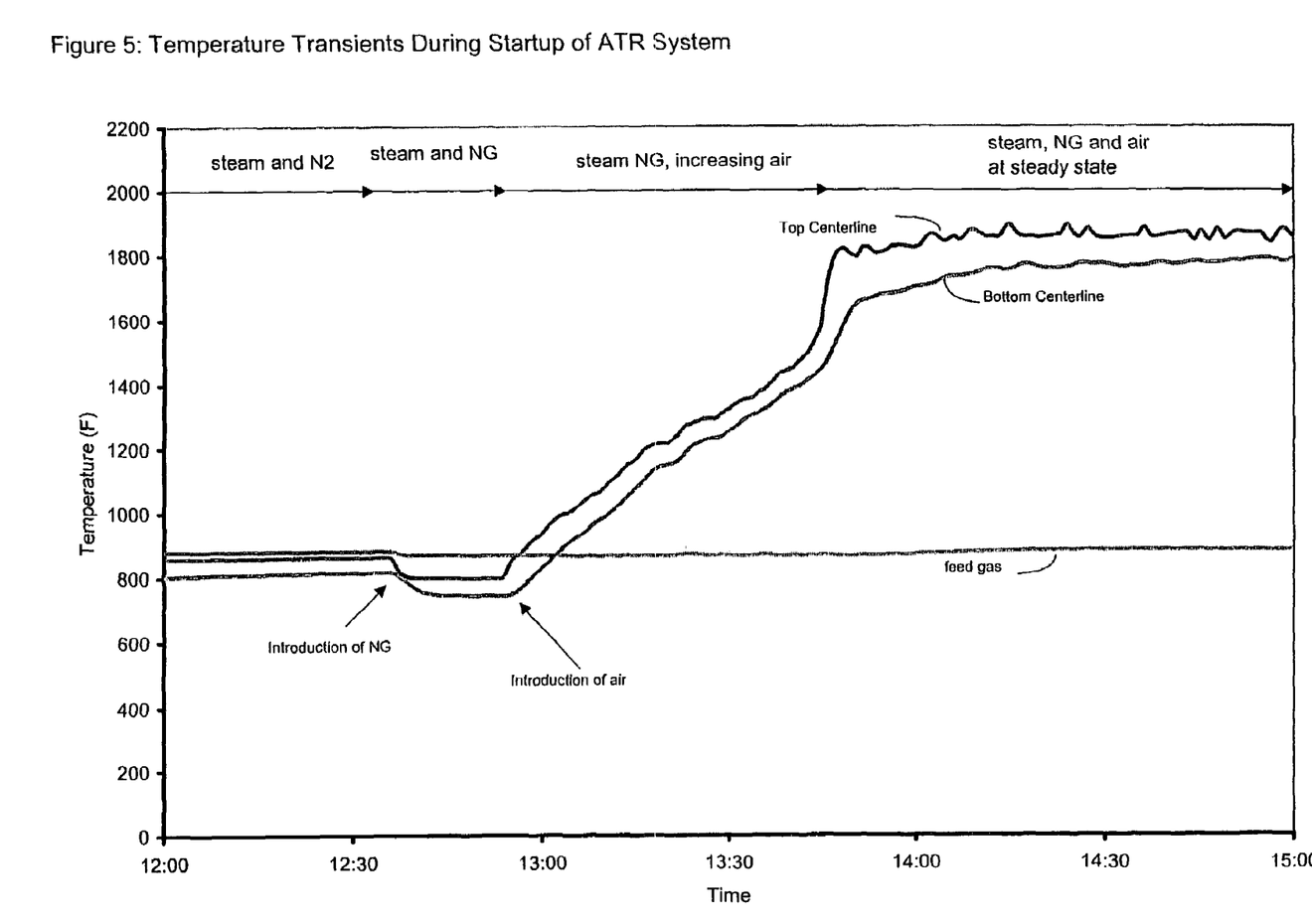
FIG. 5 is a graph depicting the temperature changes in two locations within the ATR during one embodiment of the start-up process.

A flameless ATR system operating at 60 psig and gas feed temperatures of approximately 790° to 870° F. was started up using the low steam ratio method described herein. FIGS. 4 and 5 illustrate the ATR feed gas ratios and ATR temperatures during the startup procedure. Referring to the time axis presented with each of FIGS. 4 and 5, between the time period of $T_1$ to $T_2$ wherein $T_2=T_1+30$ minutes. The system was at a steady state temperature between approximately 790° to 890° F. using a mixture of steam and natural gas and an air to natural gas ratio of zero, as indicated by the S/NG and A/NG ratio in FIG. 4 wherein S=steam and A=air. At approximately $T_2+5$ min., natural gas was introduced at a S/NG ratio of approximately 0.7, as shown in FIG. 4. The natural gas consisted of about 93% methane, about 3-5% $C_{2+}$ constituents, and about 2%-4% trace non-hydrocarbon inerts. The ATR catalyst possessed sufficient activity to conduct reforming conversion on the $C_{2+}$ constituents within the NG. The onset of pre-reforming is indicated by the decrease in temperature, about a 20° to 40° F. temperature drop, across the ATR over the time period of $T_2+10$ min. to $T_2+20$ min. as shown in FIG. 5.

The reforming activity observed with the decrease of the gas feed temperature is a positive indication that at least some of the catalyst surface area exists in a metallic state capable of promoting partial oxidation. Shortly before $T_2+30$ min. ($=T_1+1$ hr.) air was introduced at a relatively low level as shown in FIG. 4. The onset of partial oxidation was immediately observed by the temperature rise observed throughout the ATR volume. At air feed levels which were well below that necessary to develop a flammable mixture, i.e., air/NG<1.2, a temperature rise was observed throughout the reactor. As shown in FIGS. 4 and 5, as the air concentration in the ATR feed was increased there was a corresponding increase in the reactor temperature. The observed temperature rise identifies the onset of partial oxidation at ATR feed gas compositions which are well outside the flammability limit.

What is claimed is:

1. A Fischer-Tropsch process comprising the steps of:
   (a) introducing steam, NG and air into a flameless ATR having a catalyst zone wherein the amount of air introduced maintains the NG/steam/air mixture in the ATR outside the flammability envelope;
   (b) incrementally increasing the air to natural gas ratio until the NG/steam/air mixture in the reactor enters the flammability envelope and imitates heterogeneous POX in the catalyst zone of the ATR.

2. The process of claim 1 wherein the NG/steam/air mixture in step(a) is above the flammability envelope.

3. The process of claim 1 wherein the air has about 21% oxygen.

4. The process of claim 1 wherein the air is oxygen enriched air.

5. The process of claim 1 further comprising the step of introducing steam and NG having a ratio of greater than about 0.5 before step (a).

6. The process of claim 1 wherein the ATR catalyst zone comprises a nickel-containing catalyst.

7. The process of claim 1 wherein the pre-catalyst zone residence time of the NG/steam/air mixture is less than the auto-ignition onset time.

8. The process of claim 1 further comprising the step of introducing in the ATR steam and NG at a ratio greater than about 2:1 stream: NG before step (a).

9. The process of claim 1 wherein the ATR is maintained at about 60 psig and the gas feed temperature is between about 790° F. and about 870° F.

10. A process to detect ATR catalyst activity comprising the steps of:
    (a) introducing a feed gas mixture comprising steam, natural gas, and air into a flameless ATR having a catalyst zone, wherein the amount of air introduced maintains the feed gas mixture outside the flammability envelope; and
    (b) observing a decrease in temperature at some location in the catalyst zone of the ATR.

11. A process to detect ATR catalyst activity comprising the steps of:
    (a) introducing a feed gas mixture comprising steam, natural gas, and air into a flameless ATR having a catalyst zone, wherein the amount of air introduced maintains the feed gas mixture outside the flammability envelope; and
    (b) observing conversion of C2− components of the natural gas into CO or CH2 by analyzing the composition of the ATR effluent.

12. The process of claim 10 wherein the observations of step (b) are made continuously.

13. The process of claim 10 wherein the observations of step (b) are made at intervals.

14. The process of claim 11 wherein the observations of step (b) are made continuously.

15. The process of claim 11 wherein the observations of step (b) are made at intervals.

* * * * *